UNITED STATES PATENT OFFICE.

GEORG BUCHNER, OF MUNICH, GERMANY.

MEANS FOR SOFTENING WATER.

1,162,024. Specification of Letters Patent. Patented Nov. 30, 1915.

No Drawing. Application filed October 16, 1913. Serial No. 795,543.

*To all whom it may concern:*

Be it known that I, GEORG BUCHNER, citizen of Germany, residing at Munich, Bavaria, Germany, have invented certain new and useful Improvements in Means for Softening Water; and I do hereby declare the following to be a full, clear, and exact description of the invention, such as will enable others skilled in the art to which it appertains to make and use the same.

The application of scientific means for softening water, by elimination of calcium and magnesium salts, has hitherto been mainly confined to water for industrial purposes, more particularly boiler feed water. The methods which are commonly adopted for these industrial purposes, such as addition of caustic lime, potash, soda, waterglass, barium salts, oxalates and the like, are obviously not suitable for the treatment of water used for domestic ablution, in view of the fact that these added substances, if used even in slight excess, have an injurious or unpleasant effect on the skin.

The object of my invention is to provide means for softening so-called "hard water", which will effectively eliminate the calcium and magnesium salts at ordinary temperatures, by converting same into insoluble compounds, and an excess of which, present in the softened water, will have no injurious effect on the skin.

The soluble calcium and magnesium salts referred to are capable of being converted into insoluble phosphates by reaction with alkaline phosphates, but addition of the alkaline phosphates alone to water containing the highly diluted soluble salts does not result in effective or complete reaction, or only does so after a considerable period. The reaction can, however, as I have found, be greatly accelerated by adding to the water, in addition to the alkaline phosphates, a substance or substances adapted to precipitate the calcium and magnesium phosphates produced, and my invention consists in using the alkaline phosphates together with such precipitant or precipitants.

Examples of precipitants suitable for the purpose described are alkalis, alkaline earths and their carbonates and phosphates, and alkaline salts of boric acid, carbonic acid and also organic acids such as tartaric acid and the like. These substances act on the calcium and magnesium phosphates, which are first produced in a colloidal state, and greatly accelerate the precipitation thereof; they also act favorably on the physical constitution of the said salts, and prevent the formation of coarse crystalline precipitates.

The composition of the admixture used will vary according to the proportion and form in which the hardening constituents are present in the water. The following are two specific examples:—

1. 70 parts sodium phosphate, 20 parts borax, 10 parts sodium carbonate.
2. 70 parts sodium phosphate, 20 parts borax, 10 parts calcium carbonate.

The mixture may be suitably colored and scented, and may be made up in the form of a powder, paste, tablet or solution.

What I claim as my invention and desire to secure by Letters Patent of the United States is:—

1. A composition for softening water comprising di-sodium phosphate in combination with substantially non-hydrolisable means adapted to precipitate calcium phosphates and magnesium phosphates from water.
2. A composition for softening water comprising di-sodium phosphate and borax.

In testimony whereof I hereunto affix my signature in the presence of two witnesses.

GEORG BUCHNER.

Witnesses:
JOHANNA STERN,
RICHARD LEMP.